United States Patent Office
2,988,539
Patented June 13, 1961

2,988,539
CROSS-LINKED POLYMERS AND METHOD FOR THEIR PREPARATION
Louis Cohen, Cleveland, and David C. Spaulding and John F. Jones, Cuyahoga Falls, Ohio, assignors to The B. F. Goodrich Company, New York, N.Y., a corporation of New York
No Drawing. Filed Feb. 6, 1958, Ser. No. 713,558
11 Claims. (Cl. 260—78)

This invention relates to insoluble, water-swellable polymers and more specifically pertains to chemically cross-linked, insoluble, water-swellable maleic anhydride interpolymers and method of preparing same.

It is known that maleic anhydride interpolymers such as maleic anhydride-styrene copolymers will react readily under mild conditions with monohydric primary and secondary alcohols and with primary and secondary amines to form partial esters and partial amides respectively of the anhydride groups present in said interpolymers. Many of these soluble partial esters and partial amides of maleic anhydride interpolymers have been found to be useful as oil viscosity improvers, pour point depressants, adhesives, coatings and structural compositions. It is also known that maleic anhydride interpolymers will react with polyhydric primary and secondary alcohols and primary and secondary polyamines to form derivatives which fall into one of two classes, namely those which are (1) soluble and of greater molecular weight than the original polymer and those which are (2) highly cross-linked and substantially insoluble in all solvents with negligible swelling ability.

It is an object of this invention to provide a new class of maleic anhydride interpolymer derivatives falling into the unexplored and extremely interesting area between classes 1 and 2 mentioned above comprising hydrophilic maleic anhydride interpolymers which are chemically cross-linked by esterification and amidification with polyhydric primary and secondary alcohols, primary and secondary thiols, primary and secondary hydroxy thiols, primary and secondary polyamines, amino alcohols and amino thiols as opposed to the cross-linking which can be brought about by interpolymerization of a polyunsaturated vinyl monomer with maleic anhydride. It is another object of this invention to provide water-insoluble but water-swellable derivatives of interpolymers of maleic anhydride by cross-linking through esterification and amidification with polyhydric alcohols, amines, thiols, amino alcohols, amino thiols and hydroxy thiols said interpolymers with from 0.02 to 25 equivalents per hundred parts by weight of polymer of at least one of these chemical cross-linking agents. Still another object of this invention is the provision of a method for preparing said water-insoluble, water-swellable maleic anhydride interpolymer derivatives and the alkali metal, amine and ammonium salts thereof.

The maleic anhydride interpolymers useful in this invention are those which are water-soluble per se or in the form of their alkali metal, ammonium or monoamine salts, said polymers resulting from the free radical initiated polymerization of about 50 mole percent of maleic anhydride and about 50 mole percent of at least one other monomer copolymerizable therewith. The monomers copolymerizable with maleic anhydride which are embodied in this invention include the aliphatic and aromatic vinyl ethers such as methyl vinyl ether, ethyl vinyl ether, propyl vinyl ether, butyl vinyl ethers, amyl vinyl ethers, hexyl vinyl ethers, cyclohexyl vinyl ether, phenyl vinyl ether and the like; aliphatic and aromatic vinyl esters including vinyl acetate, vinyl propionate, vinyl butyrates, isopropenyl acetate, isopropenyl propionate, isopropenyl butyrates, and the like; the vinyl aromatic monomers such as styrene, alpha-halo styrenes, nuclear halogenated styrenes, alpha-methyl styrene, ethyl styrenes, and the like; monoolefins such as ethylene, propylene, isobutylene, diisobutylene, and the like; aliphatic and aromatic acrylate esters such as methyl acrylate, ethyl acrylate, propyl acrylates, butyl acrylates, amyl acrylates, hexyl acrylates, cyclohexyl acrylate, phenyl acrylate and the like; aliphatic and aromatic methacrylate esters such as methyl methacrylate, ethyl methacrylate, propyl methacrylates, butyl methacrylates, amyl methacrylates, hexyl methacrylates, cyclohexyl methacrylate, phenyl methacrylate and the like; vinyl halides such as vinyl chloride, vinyl bromide, vinyl fluoride, vinylidene chloride, vinylidene bromide, vinylidene fluoride, dichloro-difluoro ethylene, chloro-trifluoro ethylene, and the like; vinyl nitriles such as acrylonitrile, methacrylonitrile, vinylidene cyanide, alpha-cyano acrylates and the like; alpha-beta olefinically unsaturated carboxylic acids such as acrylic acid, methacrylic acid, itaconic acid, sorbic acid and the like; vinyl amides such as acrylamide, methacrylamide, N-methyl acrylamide, N-tertiary butyl acrylamide, N,N-dimethyl acrylamide, N,N-dimethyl methacrylamide, and N-vinyl pyrrolidone and the like; olefinically unsaturated tertiary amines such as the vinyl pyridines, N-vinyl piperidine, vinyl pyrimidines and the like; and the aliphatic and aromatic allyl esters such as allyl acetate, allyl propionate, allyl butyrates, allyl benzoate, methallyl acetate, methallyl propionate, methallyl butyrates, and methallyl benzoate and the like and others.

The monomers of the aforementioned types which are preferred for interpolymerization with maleic anhydride for the purpose of this invention are the vinyl ethers, the vinyl esters, the vinyl aromatic compounds and the monoolefins. The most preferred polymers for the purpose of this invention are interpolymers of maleic anhydride and at least one of the following monomers: methyl vinyl ether, ethyl vinyl ether, propyl vinyl ether, butyl vinyl ether, isobutylene, styrene, alpha-methyl styrene, vinyl acetate and vinyl propionate. Because of the inability of maleic anhydride to homopolymerize it is preferred in making the polymers of this invention to use molar ratios of maleic anhydride to the other monomer or monomers of 1 or less.

The term "chemical cross-linking agent" as used in this invention is defined to mean an organic chemical conforming to the structure $R\text{---}(X)_n$ wherein R represents an aliphatic hydrocarbon group having from 2 to 30 carbon atoms; X represents primary and secondary —OH, primary and secondary —SH, —NHR' wherein R' represents hydrogen and an alkyl group having from 1 to 12 carbon atoms; and $n$ represents a whole number of at least 2. The term "equivalent" as used herein in reference to chemical cross-linking agents is defined as the ratio of the molecular weight of $R\text{---}(X)_n$ to the numerical value of $n$.

The chemical cross-linking agents of type $R\text{---}(X)_n$ wherein R, X and $n$ have the above designation which are useful in this invention comprise polyhydric alcohols including the glycols such as ethylene glycol, the propane glycols, the butane glycols, the pentane glycols, the hexane glycols, the cyclohexane glycols, the heptane glycols, the octane glycols, the nonane glycols, the decane glycols, the undecane glycols and the dodecane glycols, the triols such as glycerol, the butane triols, the pentane triols, the hexane triols, the cyclohexane triols, the heptane triols, the octane triols, the nonane triols, the decane triols, the undecane triols, the dodecane triols, and erythrulose, the tetrols such as the butane tetrols, the pentane tetrols including pentaerythritol, the hexane tetrols, the cyclohexane tetrols, the heptane tetrols, the octane tetrols, the nonane tetrols, the decane tetrols, the undecane tetrols, the pentitols such as arabitol, adonitol, xylitol, and rhamnitol, the hexitols such as mannitol, sorbitol, and dulcitol, the heptitols such as pereseitol, and volemitol, and the higher polyhydric alcohols of the saccharide types such as raffinose, sucrose, glucose, galactose, mannose, gulose, idose, tolose, allose, fructose, sorbose, and the acetylenic and olefinic unsaturated glycols such as butynediol-1,4-divinyl glycol and dipropenylglycol; polyhydric amines such as ethylene diamine, trimethylene diamine, tetramethylene diamine, pentamethylene diamine, hexamethylene diamine, cyclohexane diamine, heptamethylene diamine, octamethylene diamine, nonamethylene diamine, decamethylene diamine, the N,N'-dialkyl ethylene diamines wherein the alkyl groups have a combined value of from 2 to 12 carbon atoms and amino bis-propylamine; polyhydric thioglycols such as ethylene dithioglycol, propylene dithioglycol, trimethylene dithioglycol, tetramethylene dithioglycol, pentamethylene dithioglycol and the like; polyhydric amino alcohols such as ethanol amine, diethanol amine, 2,3-dihydroxy propyl amine, N-alkyl ethanol amines wherein the alkyl group has from 1 to 12 carbon atoms; and thio amines such as beta-mercapto ethyl amine, beta-mercapto-N-alkyl ethyl amines wherein the alkyl group has from 1 to 12 carbon atoms and the like and others.

The maleic anhydride interpolymers useful in this invention are most conveniently prepared in an inert organic diluent such as benzene, toluene, the xylenes, chloroform, ethyl acetate and acetone which is a solvent for the monomers and a non-solvent for the polymers. Conventional free radical catalysts including benzoyl peroxide, caprylyl peroxide, cumene hydroperoxide and azo-bis-isobutyronitrile are used in preparing said polymers and the polymerization reaction is carried out preferably in the absence of oxygen.

The chemical cross-linking reaction, or stated differently, the reaction between the maleic anhydride interpolymer and the chemical cross-linking agents to form intermolecular bridges in the polymer, is most conveniently carried out by mixing from 0.02 to 10 equivalents per hundred parts by weight of polymer of the chemical cross-linking agent and more preferably from 0.02 to 0.9 equivalents per hundred parts by weight of polymer and additional inert diluent with the high conversion polymer slurry and allowing the reaction to proceed in the slurry at temperature of from 25° C. to 100° C. The cross-linking reaction is facilitated when the cross-linking agent is a polyol or a polythiol by the inclusion of a catalytic amount of a soluble basic tertiary amine such as pyridine or triethyl amine in the reaction medium.

It is often more convenient to carry out the cross-linking reaction by simply mixing the dry polymer with the proper level of chemical cross-linking agent or to add the chemical cross-linking agent to the the water which is to be used for making the thick mucilage prior to the addition of the dry maleic anhydride interpolymer to said water. The last mentioned method works best when the chemical cross-linking agent is a polyamine, amino alcohol or an amino thiol and the preferred range of chemical cross-linking agent in this method is from about 1 to about 25 equivalents per hundred parts by weight of polymers. In the addition of the chemical cross-linking agent to the water prior to addition of the dry maleic anhydride interpolymer there is a competition between water and the chemical cross-linking agent in the reaction with the maleic anhydride groups of the maelic anhydride interpolymer and as a result of this competition it is necessary that a generally higher level of chemical cross-linking agent be used in order to achieve a given viscosity for the mucilage than would otherwise be necessary in the preferred methods. The first mentioned two methods for cross-linking the maleic anhydride interpolymers embodied in this invention are preferred because of the greater efficiency of the chemical cross-linking agents in said methods.

The aqueous mucilages which result when the cross-linked maleic anhydride interpolymers embodied in this invention are dispersed in water have unusually high viscosities at low polymer concentrations when compared to the viscosity of the untreated maleic anhydride interpolymer. The mucilage viscosities vary for a given chemically cross-linked maleic anhydride interpolymer as the pH of the aqueous system is varied. The most efficient thickening generally occurs at pH's of from 4 to 9 and more preferably from 6 to 8. This pH adjustment is accomplished by including an alkali metal hydroxide or carbonate, ammonium hydroxide or carbonate, or organic amines having one amino group per molecule in the aqueous mucilage mixture. Because gross amounts of polyvalent metal bases cause insolubilization of the polymers of this invention, it is preferred to use no more than 20% of said polyvalent metal bases such as calcium hydroxide, magnesium hydroxide, and the like in conjunction with the monovalent neutralization agents mentioned above.

The chemically cross-linked maleic anhydride interpolymers embodied in this invention are useful as thickeners for household polish and cleaner formulations, as bodying agents and suspending agents in auto polish and cleaner formulations and as suspending agents for sand in oil and water well fracturing. Excellent emulsions can be made using the polymers of this invention as emulsifiers and emulsion stabilizers. A maleic anhydride-methyl vinyl ether interpolymer for example, can be used to emulsify mineral oil in water when said polymer is neutralized to a pH of about 7 with a basic monovalent ion, however, the emulsion which results will "cream" in a relatively short time after it has been formed. The polymers embodied in this invention, however, because of their three dimensional cross-linked nature will both emulsify mineral oil in water and stabilize said emulsion against creaming.

The following examples are specific illustrations and not limitations on the scope of this invention. The amounts of ingredients used in the following examples are given in parts by weight unless otherwise noted. The viscosities listed in the following examples were obtained with a Brookfield rotational viscometer and the values are expressed in centipoises.

Example I

The linear maleic anhydride-methyl vinyl ether polymer which was used in this and the following two examples was prepared at 50° C. in a nitrogen atmosphere from the following recipe:

Maleic anhydride _____ 62.75
Methyl vinyl ether _____ 37.25
Benzoyl peroxide _____ 2.0
Benzene (dry) _____ 880

The monomers were converted to polymer in from 4 to 8 hours. Each of the resulting thick slurries was treated with an additional 100 g. of dry benzene containing a trace of pyridine and the amount of sorbitol specified in the following table. The polymer derivatives were isolated by suction filtration and were dried at 50° C. for 16 hours. The viscosities for aqueous mucilages of each chemically cross-linked polymer were determined at a pH of about 7. The following 1.5% mucilages were made by mixing 1.5 g. of polymer, 88.5 cc. of distilled water and 11.5 cc. of aqueous 5% NaOH solution in a 4 ounce wide mouthed bottle.

| Equivalents of Sorbitol/100 Parts Polymer | Viscosities in cps. | | |
|---|---|---|---|
| | 1.5% Conc. | 0.5% Conc. | 0.25% Conc. |
| 0.025 | 7,200 | 1,640 | 880 |
| 0.051 | 9,600 | 3,200 | 1,480 |
| 0.21 | 75,200 | 28,800 | 13,600 |
| 0.42 | 80,000 | 7,200 | 880 |
| 0.84 | 107,200 | 17,600 | 1,600 |
| Control | 120 | 40 | 20 |

The maximum efficiency of sorbitol occurs at about 0.21 equivalents per 100 parts of polymer. For purposes of comparison a control or untreated maleic anhydride/methyl vinyl ether copolymer was included in the above table.

*Example II*

Maleic anhydride-methyl vinyl ether copolymers described in Example I were treated in benzene with varying amounts of ethanol amine. The dry polymer was added at various concentrations to water and the aqueous mucilage viscosities at pH about 7 were determined. The aqueous mucilages were prepared in a manner similar to that described in Example I.

| Equivalents of Ethanol Amine per 100 Parts of Polymer | Viscosities in cps. | | |
|---|---|---|---|
| | 1.5% Conc. | 0.5% Conc. | 0.25% Conc. |
| 0.026 | 27,200 | 3,600 | 1,280 |
| 0.052 | 35,200 | 7,200 | 3,600 |
| 0.197 | 48,000 | 16 | 0 |
| Control | 120 | 40 | 20 |

The optimum level of ethanol amine is about 0.052 equivalent weighs per hundred parts of polymer.

*Example III*

Benzene slurries of the maleic anhydride-methyl vinyl ether copolymer described in Example I were treated with varying amounts of glycerol in the presence of trace amounts (about 0.1 part per hundred parts of polymer) of pyridine. Aqueous mucilages of the treated polymers had the following viscosities at pH of about 7.

| Equivalents of Glycerol per 100 Parts of Polymer | Viscosities in cps. | | |
|---|---|---|---|
| | 1.5% Conc. | 1.0% Conc. | 0.5% Conc. |
| 0.0326 | 88,000 | 40,000 | 20,000 |
| 0.0652 | 224,000 | 112,000 | 20,000 |
| 0.0978 | 56,000 | 24,000 | |
| 0.13 | 36,000 | 24,000 | |
| 0.16 | 20,000 | 2,000 | |
| 0.00 | 120 | 40 | 20 |

The optimum level of glycerol is about 0.065 equivalents per hundred parts of polymer.

*Example IV*

Aqueous mucilages were prepared by adding 1.5 gram amounts of the maleic anhydride-methyl vinyl ether copolymer described in Example I to 100 grams of distilled water containing a specified amount of ethanol amine and allowing the resulting slurries to stand from 8 to 24 hours at room temperature prior to neutralization to pH 7 with sodium hydroxide. Mucilage viscosities of the pH 7 mucilages are given in the following table:

| Equivalents of Ethanol Amine Per Hundred Parts of Polymer | Viscosities in cps. | | | |
|---|---|---|---|---|
| | 1.5% Conc. | 1.0% Conc. | 0.5% Conc. | 0.06% Conc. |
| 0.053 | 16,000 | 9,600 | 4,000 | 140 |
| 1.06 | 38,400 | 14,400 | 5,600 | 100 |
| 1.99 | 110,400 | 60,800 | 29,600 | 460 |
| 3.98 | 152,000 | 97,600 | 43,200 | 180 |
| 7.96 | 158,400 | 128,000 | 24,000 | 20 |
| 12.00 | 160,000 | 96,000 | 24,000 | 0 |
| 15.9 | 169,600 | 126,400 | 33,600 | 0 |
| 19.9 | 193,600 | 155,200 | 48,000 | 60 |
| 24.0 | 232,000 | 132,000 | 45,600 | 100 |
| 25.6 | 249,600 | 150,400 | 46,400 | 40 |

The maleic anhydride-methyl vinyl ether copolymer treated in water with 1.06 equivalents per hundred parts of polymer of ethylene glycol with a trace of pyridine present in a manner similar to that mentioned above showed a pH 7 mucilage viscosity at 1.5% polymer concentration of 2,520 cps. The maleic anhydride-methyl vinyl ether copolymer treated in water with 1.17 equivalents per hundred parts of polymer of sucrose showed a pH 7 mucilage viscosity at 1% polymer concentration of 16,000 cps.

*Example V*

Aqueous mucilages were prepared in the manner described in Example IV with the exception that ethylene diamine was used in the present example in place of ethanol amine.

| Equivalents of Ethylene Diamine Per Hundred Parts of Polymer | Viscosities in cps. | | | |
|---|---|---|---|---|
| | 1.5% Conc. | 1.0% Conc. | 0.5% Conc. | 0.125% Conc. |
| 0.053 | 680 | 400 | 200 | 60 |
| 1.06 | 2,740 | 1,360 | 560 | 140 |
| 1.99 | 54,400 | 29,600 | 7,200 | 320 |
| 3.98 | 36,800 | 13,600 | 1,360 | 20 |
| 7.96 | 12,800 | 2,480 | 40 | 0 |

*Example VI*

100 gram amounts of the maleic anhydride-methyl vinyl ether copolymer described in Example I were treated with approximately 0.097 equivalents per hundred parts of polymer of the following ingredients at 50° C. for 24 hours in benzene. For purposes of comparison of the viscosities of the chemically cross-linked polymers with an uncross-linked polymer, a control or an untreated maleic anhydride-methyl vinyl ether polymer is included in the following table:

| Chemical Cross-Linking Agent | Viscosities in cps. | | |
|---|---|---|---|
| | 1.5% Conc. | 0.5% Conc. | 0.25% Conc. |
| Ethylene glycol | 122,400 | 40,000 | 6,400 |
| Glycerol | 42,400 | 17,600 | 10,400 |
| Pentaerythritol | 8,800 | 1,200 | 700 |
| Sorbitol | 32,400 | 8,000 | 4,040 |
| Ethylene diamine | 96,000 | 26,400 | 9,600 |
| 2-mercapto ethanol | 35,200 | 16,000 | 11,200 |
| Control | 120 | 40 | 20 |

The aqueous mucilages of these polymers were prepared in the manner described in Example I. A maleic anhydride-methyl vinyl ether copolymer cross-linked with 0.07 equivalent of sucrose per hundred parts of polymer had an aqueous mucilage viscosity of 7,000 cps. at 1% polymer and pH 7. The above-listed mucilages with the exception of the control are excellent for bodying cosmetic formulations such as cold cream, hand cream, and are also useful in household cleaners as thickeners and suspending agents for pigments and abrasives, an extremely stable aqueous suspension of 20% by weight of titanium dioxide was made by blending 160 grams of the 0.25% concentration, glycerol-treated, maleic anhydride-methyl vinyl ether polymer mucilage described above with 40 grams of titanium dioxide in a Waring blender for 30 seconds. Centrifugation of said titanium dioxide suspension at 1500 r.p.m. for 1 hour caused little settling of the pigment.

*Example VII*

The maleic anhydride-isobutylene copolymers used in this example were prepared by the procedure described in Example I from the following recipe:

Maleic anhydride _____ 63.5
Isobutylene _____ 36.5
Benzoyl peroxide _____ 2.0
Benzene _____ 880

100 gram amounts of this polymer were cross-linked with approximately 0.097 equivalents per hundred of each chemical cross-linking agent. As a control, an untreated maleic anhydride-isobutylene polymer is included in the following table for comparative purposes. All polymer mucilages in this example were made by mixing 1.5 grams of polymer, 88.3 grams of distilled water and 11.7 ml. of 5% aqueous NaOH.

| Chemical Cross-Linking Agent | Viscosities in cps. | | |
| --- | --- | --- | --- |
| | 1.5% Conc. | 0.5% Conc. | 0.25% Conc. |
| Ethylene diamine | 42,800 | 5,600 | 1,040 |
| Hexamethylene diamine | 18,400 | 200 | 20 |
| Diethylene triamine | 33,600 | 280 | 0 |
| Ethylene glycol | 182,400 | 40,000 | 6,400 |
| 2-Mercapto ethanol | 6,400 | 1,720 | 960 |
| Control | 60 | 0 | 0 |

An aqueous suspension of fine sand stabilized by the 0.25% concentration ethylene diamine treated polymer mucilage, described above, was stable for more than a week at room temperature.

*Example VIII*

The maleic anhydride-styrene copolymer used in this experiment was prepared by the method described in Example I from the following recipe:

Maleic anhydride _____ 48.5
Styrene _____ 51.5
Benzoyl peroxide _____ 2.0
Benzene _____ 880

100 gram amounts of this maleic anhydride-styrene copolymer were cross-linked with approximately 0.097 equivalents per hundred of polymer of each of the chemical cross-linking agents listed in the following table. Viscosities were measured on the aqueous mucilages of said polymers resulting from mixtures of 1.5 grams polymer, 91.1 grams of distilled water and 8.9 ml. of 5% aqueous NaOH.

| Chemical Cross-Linking Agent | Viscosities in cps. | | |
| --- | --- | --- | --- |
| | 1.5% Conc. | 0.5% Conc. | 0.25% Conc. |
| Ethanol amine | 36,800 | 2,600 | 160 |
| 2-Amino-1-butanol | 48,000 | 5,600 | 440 |
| p-Amino phenol | 200 | 80 | 40 |
| Ethylene glycol | 36,800 | 9,600 | 6,400 |
| Ethylene diamine | 20,800 | 1,360 | 60 |
| 2-Mercapto ethanol | 56,000 | 7,640 | 280 |
| Control | 100 | 40 | 20 |

The decided advantage the aliphatic chemical cross-linking agents of this invention have over their aromatic counterparts is obvious when p-amino phenol is compared to the other chemical cross-linking agents in this example.

*Example IX*

The maleic anhydride-vinyl acetate copolymer used in this example was prepared by the polymerization procedure described in Example I from the following recipe:

Maleic anhydride _____ 53.0
Vinyl acetate _____ 47.0
Benzoyl peroxide _____ 2.0
Benzene _____ 880

100 gram amounts of this polymer were treated with approximately 0.097 equivalents per hundred parts of polymer of each of the following chemical cross-linking agents. A control is listed for comparison.

| Chemical Cross-Linking Agent | Viscosities in cps. | | |
| --- | --- | --- | --- |
| | 1.5% Conc. | 0.5% Conc. | 0.25% Conc. |
| Ethylene glycol | 105,200 | 25,600 | 4,000 |
| 2-Mercapto ethanol | 7,000 | 600 | 200 |
| Control | 20 | 0 | 0 |

We claim:
1. The reaction product of an interpolymer of maleic anhydride and at least one other monomer selected from the class consisting of a monoolefinically unsaturated vinyl ether having from 3 to 8 carbon atoms, a monoolefinically unsaturated vinyl ester of a carboxylic acid said ester having from 4 to 10 carbon atoms and a terminally unsaturated monoolefinic hydrocarbon having from 2 to 9 carbon atoms, the molar ratio of said maleic anhydride to said other monomer being substantially one, with from 0.02 to 0.9 equivalent per hundred parts by weight of said interpolymer of a chemical cross-linking agent conforming to the structure $R—(X)_n$ wherein R represents an aliphatic hydrocarbon group having from 1 to 30 carbon atoms; X is a member of the class consisting of OH, SH, and NHR' groups attached to a member selected from the class consisting of primary and secondary carbon atoms wherein R' is a member of the class consisting of hydrogen and an alkyl group having from 1 to 12 carbon atoms; and $n$ is a whole number of from 2 to 11 inclusive, an equivalent being defined as the ratio of the molecular weight of $R—(X)_n$ to the numerical value of $n$, said reaction product having a viscosity of at least 680 centipoises in distilled water when present in 1.5% by weight concentration at pH about 7.

2. The reaction product of an interpolymer of substantially equimolar quantities of maleic anhydride and methyl vinyl ether with from 0.02 to 0.9 equivalent per hundred parts by weight of said interpolymer of glycerol, said reaction product having a viscosity of at least 680 centipoises in distilled water when present in 1.5% by weight concentration at pH about 7.

3. The reaction product of an interpolymer of substantially equimolar quantities of maleic anhydride and methyl vinyl ether with from 0.02 to 0.9 equivalent per hundred parts by weight of said interpolymer of ethylene glycol, said reaction product having a viscosity of at least 680 centipoises in distilled water when present in 1.5% by weight concentration at pH about 7.

4. The reaction product of an interpolymer of substantially equimolar quantities of maleic anhydride and methyl vinyl ether with from 0.02 to 0.9 equivalent per hundred parts by weight of said interpolymer of ethylene diamine, said reaction product having a viscosity of at least 680 centipoises in distilled water when present in 1.5% by weight concentration at pH about 7.

5. The reaction product of an interpolymer of substantially equimolar quantities of maleic anhydride and methyl vinyl ether with from 0.02 to 0.9 equivalent per hundred parts by weight of said interpolymer of ethanol amine, said reaction product having a viscosity of at least 680 centipoises in distilled water when present in 1.5% by weight concentration at pH about 7.

6. The reaction product of an interpolymer of substantially equimolar quantities of maleic anhydride and isobutylene with from 0.02 to 0.9 equivalent per hundred parts by weight of said interpolymer of ethylene glycol, said reaction product having a viscosity of at least 680 centipoises in distilled water when present in 1.5% by weight concentration at pH about 7.

7. The method for preparing a cross-linked water-swellable but water-insoluble derivative of a linear interpolymer of maleic anhydride and at least one other monomer selected from the class consisting of a monoolefinically unsaturated vinyl ether having from 3 to 8 carbon atoms, a monoolefinically unsaturated vinyl ester of a carboxylic acid, said ester having from 4 to 10 carbon atoms and a terminally unsaturated monoolefinic hydrocarbon having from 2 to 9 carbon atoms, the molar ratio of said maleic anhydride to said other monomers being substantially one, said method comprising mixing said linear interpolymer with from 0.02 to 0.9 equivalent per hundred parts by weight of said interpolymer of a chemical cross-linking agent conforming to the structure $$R—(X)_n$$

wherein R represents an aliphatic hydrocarbon group having from 1 to 30 carbon atoms; X is a member selected from the group consisting of OH, SH, and NHR' groups attached to a member selected from the class consisting of primary and secondary carbon atoms wherein R' is a member of the class consisting of hydrogen and an alkyl group having from 1 to 12 carbon atoms; and $n$ represents a whole number of from 2 to 11 inclusive, at a temperature of from about 25° C. to about 100° C. in an inert organic diluent, an equivalent being defined as the ratio of the molecular weight of R—$(X)_n$ to the numerical value of $n$.

8. The method for preparing a cross-linked water-swellable but water-insoluble derivative of a linear interpolymer of maleic anhydride and at least one other monomer selected from the class consisting of a monoolefinically unsaturated vinyl ether having from 3 to 8 carbon atoms, a monoolefinically unsaturated vinyl ester of a carboxylic acid said ester having from 4 to 10 carbon atoms and a terminally unsaturated monoolefinic hydrocarbon having from 2 to 9 carbon atoms, the molar ratio of said maleic anhydride to said other monomers being substantially one, said method comprising mixing said linear interpolymer with from 0.02 to 0.9 equivalent per hundred parts by weight of said interpolymer of a chemical cross-linking agent conforming to the structure $$R—(X)_n$$

wherein R represents an aliphatic hydrocarbon group having from 1 to 30 carbon atoms; X is a member selected from the group consisting of OH, SH, and NHR' groups attached to a member selected from the class consisting of primary and secondary carbon atoms wherein R' is a member of the class consisting of hydrogen and an alkyl group having from 1 to 12 carbon atoms; and $n$ represents a whole number of from 2 to 11 inclusive in the presence of about 0.1 part per hundred parts of said linear interpolymer of a tertiary amine, at a temperature of from about 25° C. to about 100° C. in an inert organic diluent, an equivalent being defined as the ratio of the molecular weight of R—$(X)_n$ to the numerical value of $n$.

9. The method of claim 8 wherein the inert organic diluent is benzene.

10. The method of claim 8 wherein the tertiary amine is pyridine.

11. The method for preparing a cross-linked water-swellable but water-insoluble derivative of a linear interpolymer of maleic anhydride and at least one other monomer selected from the class consisting of a monoolefinically unsaturated vinyl ether having from 3 to 8 carbon atoms, a monoolefinically unsaturated vinyl ester of a carboxylic acid, said ester having from 4 to 10 carbon atoms and a terminally unsaturated monoolefinic hydrocarbon having from 2 to 9 carbon atoms, the molar ratio of said maleic anhydride to said other monomer being substantially one, comprising mixing said linear interpolymer with from 1.0 to 25 equivalents per hundred parts by weight of said interpolymer of a chemical cross-linking agent conforming to the structure R—$(X)_n$ wherein R represents an aliphatic hydrocarbon group having from 1 to 30 carbon atoms; X is a member of the class consisting of OH, SH, and NHR' groups attached to a member selected from the class consisting of primary and secondary carbon atoms wherein R' is a member of the class consisting of hydrogen and an alkyl group having from 1 to 12 carbon atoms; and $n$ is a whole number of 2 to 11 inclusive, in an aqueous solution of said chemical cross-linking agent at a temperature of from about 25° C. to about 100° C., an equivalent being defined as the ratio of the molecular weight of R—$(X)_n$ to the numerical value of $n$.

References Cited in the file of this patent

UNITED STATES PATENTS

| | | |
|---|---|---|
| 2,047,398 | Voss et al. | July 14, 1936 |
| 2,324,739 | Stoops | July 20, 1943 |
| 2,418,688 | Atwood | Apr. 8, 1947 |
| 2,746,837 | Kirk | May 22, 1956 |

OTHER REFERENCES

Seymour et al.: Ind. and Eng. Chem., vol. 41, No. 7, pp. 1509–1513 (1949).

Fordyce et al.: Journ. Amer. Chem. Soc., vol. 73, No. 1, pp. 62–65 (1951).

Schildknecht: Vinyl and Related Polymers, Wiley (1952), pp. 68–72.